US011010070B2

(12) United States Patent
Moore (10) Patent No.: US 11,010,070 B2
(45) Date of Patent: May 18, 2021

(54) METHODS FOR ALIGNED, MPU REGION, AND VERY SMALL HEAP BLOCK ALLOCATIONS

(71) Applicant: Ralph Crittenden Moore, Costa Mesa, CA (US)

(72) Inventor: Ralph Crittenden Moore, Costa Mesa, CA (US)

(*) Notice: Subject to any disclaimer, the term of this patent is extended or adjusted under 35 U.S.C. 154(b) by 146 days.

(21) Appl. No.: 16/264,321

(22) Filed: Jan. 31, 2019

(65) Prior Publication Data

US 2020/0249852 A1    Aug. 6, 2020

(51) Int. Cl.
*G06F 3/06*     (2006.01)
*G06F 12/02*    (2006.01)

(52) U.S. Cl.
CPC .......... *G06F 3/0631* (2013.01); *G06F 3/0604* (2013.01); *G06F 3/064* (2013.01); *G06F 3/0644* (2013.01); *G06F 3/0659* (2013.01); *G06F 3/0673* (2013.01); *G06F 12/023* (2013.01)

(58) Field of Classification Search
CPC ...... G06F 3/0604; G06F 3/0631; G06F 3/064; G06F 3/0644; G06F 3/0659; G06F 3/0673; G06F 12/0223; G06F 12/023
USPC ........................................................ 711/171
See application file for complete search history.

(56) References Cited

U.S. PATENT DOCUMENTS

| 5,561,786 | A | * | 10/1996 | Morse | G06F 12/023 711/170 |
|---|---|---|---|---|---|
| 5,680,582 | A | * | 10/1997 | Slayden | G06F 12/023 711/171 |
| 5,784,699 | A | * | 7/1998 | McMahon | G06F 12/023 711/170 |
| 6,070,202 | A | * | 5/2000 | Minkoff | G06F 9/5016 710/56 |
| 6,412,053 | B2 | * | 6/2002 | Bonola | G06F 12/023 711/170 |
| 6,757,802 | B2 | * | 6/2004 | Trainin | G06F 12/023 707/999.202 |
| 7,962,707 | B2 | * | 6/2011 | Kaakani | G06F 12/0269 711/159 |
| 8,015,385 | B2 | * | 9/2011 | Schopp | G06F 12/023 711/171 |
| 8,838,928 | B2 | * | 9/2014 | Robin | G06F 12/023 711/170 |

(Continued)

OTHER PUBLICATIONS

Lea, Doug, "A Memory Allocator", last modified Apr. 4, 2000, retrieved from <gee.cs.oswego.edu/dl/html/malloc.html> (Year: 2000).*

(Continued)

*Primary Examiner* — Reginald G Bragdon
*Assistant Examiner* — Aaron D Ho (57) ABSTRACT

Provides an efficient method for aligned heap allocations based upon spare space management, provides an efficient method for MPU region allocations based upon aligned subregion allocations, and provides integrated block pools for small data blocks with heap backup if size or alignment requirements cannot be met from pools or pools are empty. The operation of malloc( ), calloc( ), realloc( ) and free( ) on pool blocks versus heap blocks is transparent to application code. These methods are suitable for limited-memory, real-time systems as well as for general-purpose systems.

13 Claims, 8 Drawing Sheets

(56) References Cited

U.S. PATENT DOCUMENTS

| | | | |
|---|---|---|---|
| 2004/0139272 A1* | 7/2004 | Rodriguez-Rivera | ........................ G06F 12/0253 711/100 |
| 2010/0205374 A1* | 8/2010 | Meka | .................... G06F 12/023 711/117 |
| 2014/0282589 A1* | 9/2014 | Kuang | .................. G06F 9/5016 718/104 |
| 2019/0073145 A1* | 3/2019 | Angelino | .............. G06F 21/575 |
| 2020/0097646 A1* | 3/2020 | Buhren | ................. G06F 9/5016 |

OTHER PUBLICATIONS

Lea, Doug, "malloc-2.8.2.c", Version 2.8.2, Jun. 12, 2005, retrieved from <gee.cs.oswego.edu/pub/misc/malloc-2.8.2.c> (Year: 2005).*

Yoonseo Choi and Hwansoo Han. 2006. Protected heap sharing for memory-constrained java environments. In Proceedings of the 2006 international conference on Compilers, architecture and synthesis for embedded systems (CASES '06). Association for Computing Machinery, New York, NY, USA, 212-222. (Year: 2006).*

Ross McIlroy, Peter Dickman, and Joe Sventek. 2008. Efficient dynamic heap allocation of scratch-pad memory. In Proceedings of the 7th international symposium on Memory management (ISMM '08). Association for Computing Machinery, New York, NY, USA, 31-40. DOI:https://doi.org/10.1145/1375634.1375640 (Year: 2008).*

U. Seshua, N. Bussa and B. Vermeulen, "A Run-Time Memory Protection Methodology," 2007 Asia and South Pacific Design Automation Conference, Yokohama, 2007, pp. 498-503, doi: 10.1109/ASPDAC.2007.358035. (Year: 2007).*

* cited by examiner

METHODS FOR ALIGNED, MPU REGION, AND VERY SMALL HEAP BLOCK ALLOCATIONS

PROGRAM LISTINGS eheap.c is the complete source code for the heap described in this invention.

eheap.h provides definitions and examples of configuration constant definitions that are necessary to use eheap in an embedded or similar environment.

edemo.c is demonstration code for eheap.

BACKGROUND

The following discussion centers on embedded systems because their requirements are well understood. However, the methods presented herein should not be considered to be limited to embedded systems.

In a previous patent application (Moore U.S. Ser. No. 15/441,065 titled "Optimizable Heap for Embedded and Similar Systems with Enhanced Debugging and Self-Healing", Aug. 23, 2018) an invention comprising several methods to improve heaps for embedded systems was presented. None of the methods presented in this patent application were included in that prior application. Nonetheless, information contained therein may be helpful to understand the requirements for embedded system heaps.

Heaps are well-known structures used in computer systems to provide dynamic memory allocation and deallocation. Due to the simple nature of most embedded systems, heaps have not been used extensively in them. However, embedded systems are becoming more complex and their need for dynamic memory allocation is increasing.

Embedded systems are characterized by the following requirements:
  Deterministic and rapid response to events.
  Limited memory and processor speed due to cost and power constraints.
  Unattended operation in harsh environments.
  Substantial functional variation from one embedded system to the next.

Although targeted at the above requirements, this invention is not limited to embedded systems. Other systems may share some of the above characteristics or require the enhanced performance and security offered by this invention and thus benefit from it. Therefore, the term "embedded system" should not be interpreted to exclude other systems.

Aligned Allocations: dlmalloc created by Doug Lea performs aligned allocations (gee.cs.oswego.edu/pub/misc/malllloc-2.8.2.c, 5/27/09). Alignment is on power-of-two boundaries. For an aligned allocation, it seldom happens that the data block is already aligned. Hence, there usually is spare space between the chunk control block (CCB) and the aligned data block. dlmalloc requires that this space be at least as large as the minimum size chunk allowed by it and the space is made into a new free chunk. This approach has two disadvantages:
  1. The minimum chunk size requirement forces the chunk found to be larger than if there were no such requirement.
  2. Heap fragmentation is increased due to the formation of otherwise unnecessary small chunks.

These create size and performance problems, which may be prohibitive for embedded systems.

In another approach by Alexander Tomlinson (US Pub. 20130346719 titled "Systems and Methods for Efficient Memory Access", Dec. 26, 2013), a pointer to the chunk control block is loaded below the aligned data block and space between it and the chunk control block is simply wasted. This has two disadvantages:
  1. Wasted space can be significant and is irrecoverable unless the data block is freed.
  2. Creates a chunk that has a different format than normal chunks.

The first is likely to be too inefficient for limited-memory systems. The second introduces debugging complexity.

Numerous power-of-two data block size allocators exist (e.g. Binary Buddy Algorithm: Kenneth Knowlton, "A fast storage allocator" Comm of the ACM 8(10):623-625), for which data blocks are naturally aligned on powers of two. However, these allocators do not permit allocating data blocks specified sizes with specified alignments.

MPU Region Allocations: The Cortex v7M processor architecture from ARM Ltd. is by far dominant architecture for Micro Controller Units (MCUs) used in embedded systems. This architecture is the basis for hundreds of different types of MCUs, manufactured by dozens of semiconductor vendors, and billions of these MCUs have been shipped, to date. The Cortex v7M architecture includes a Memory Protection Unit (MPU), which presents memory regions to application code. Such code cannot access memory outside of the MPU regions. In addition, each MPU region permits only certain types of accesses such as execute never, read only, read/write, etc. Any violation of a memory address or an access attribute triggers a Memory Manage Fault (MMF), which stops the application code and allows the operating system to take over.

Thus, an MPU effectively thwarts malware from gaining system control, thus improving the security of embedded systems that control automobiles, machinery, etc. This has become increasing important due to connection of more and more embedded systems to the Internet, known as the Internet of Things (IoT). Unfortunately, these connections allow hackers access to highly vulnerable embedded systems.

Unfortunately, each Cortex v7M MPU region must be a power of two in size and must be aligned upon its size boundary. This makes the MPU difficult to use in embedded systems, which typically have very small memories compared to general purpose systems such as laptops, servers, and smart phones. As a consequence, the Cortex v7M MPU has been little-used in embedded systems despite growing security threats to embedded systems.

Heaps are typically used to allocate task stacks, buffers, messages, etc. It is highly desirable to put these into individual MPU regions so that malware can be easily caught and hackers stopped in their tracks. However, no known heap permits MPU region allocations.

Large Numbers of Small Data blocks: Due to the increasing complexity of embedded systems, more and more application code is being written in object-oriented languages such as C++ and Java. These languages are easier to use for application code than the traditional C and assembly languages used heretofore.

An inherent characteristic of such languages is that applications often allocate hundreds, or even thousands of small objects from the heap. These objects may be as small as 8 bytes. As a consequence, general-purpose heaps such as dlmalloc place major emphasis upon low overhead per inuse data block. These heaps typically have only 8 bytes of overhead on an 8-byte data block or 4 bytes of overhead on a 12-byte data block, giving overheads of 100% or 50%, respectively. However, even this much overhead may be too much for an embedded or similar system having very restricted amounts memory if hundreds or thousands of small objects are needed.

In addition, the resulting dlmalloc heap structure is fragile since it is not possible to scan the heap in both directions in order to fix broken links. This is an acceptable weakness for general-purpose systems in which applications (e.g. word processors) run for only a few hours or a day, at a time. It is unacceptable for embedded systems, which are expected to run forever in harsh environments and with no operator presence. In such systems many single-bit memory errors are likely to occur during their operational lifetimes. Such errors can cause serious damage if not caught and fixed quickly.

Many heaps are based upon block pools. Examples are McMahon U.S. Pat. No. 5,784,699 titled "Dynamic Memory Allocation in a Computer Using a Bit Map Index" 7/21/98 and Czajkowski U.S. Pat. No. 6,453,403 titled "System and Method for Memory Management Using Contiguous Fixed-Size Blocks", Sep. 17, 2002. See Wilson, "Dynamic Storage Allocation: A Survey and Critical Review", for other examples. The problem with these methods is that while block pools are efficient for very small data blocks, they impose having a very large number of block pools or having data blocks that are generally too large for larger data blocks. Neither of these is good for limited memory systems.

eheap Demonstration Code eheap source code has been included to meet the full disclosure requirement. eheap.c is the complete code for eheap and edemo.c demonstrates features relevant to this invention. Compile both, link, and run using IAR EWARM C/C++ for any supported evaluation board. Also, can compile and run on a PC using Microsoft Visual C/C++, however some editing may be required due to compiler differences.

SUMMARY OF THE INVENTION

The inventive subject matter consists of three parts:
1. A method of efficiently using spare space between a chunk control block (CCB) and an aligned data block in a chunk.
2. A method based upon the foregoing to allocate a subregion-aligned data block consisting of one or more subregions all of which are within a single MPU region, such that the data block can operate as an MPU region.
3. A method of providing integrated block pools within a heap such that data blocks meeting size and alignment requirements come from block pools that are not empty, or otherwise come from the heap in a completely transparent manner to application code.

DETAILED DESCRIPTION

The following information describes a simple embodiment of the invention sufficient to explain how it works. Other possible embodiments may be mentioned where useful to illustrate the scope of the invention. Drawings are not to scale for the sake of clarity. In the descriptions that follow, the term "heap memory" means the memory from which data is allocated. Heap memory is composed of chunks; each chunk contains a Chunk Control Block (CCB) followed by a data block. The data block is what is allocated to a program. The CCB contains information necessary to manage the chunk and the heap. A chunk with an allocated data block is called an "inuse" chunk. A chunk with a free data block is called a "free" chunk.

The heap structure described herein is a basic heap for which various search mechanisms may be used such as linear search, bin search, tree search, etc. The search mechanism is not important for this invention. The chunks in the heap must be linked together in order. Usually forward and backward pointers are used, but chunk and prechunk sizes or other methods may equally be used. The exact mechanism for doing this is also not important for this invention.

It often happens that a chunk is larger than necessary and residual space is left at the top in the chunk above the data block. Typically, this space is merged with a free postchunk, split into a new free chunk, or left in the allocated chunk. The mechanisms for this are not important for this invention. Hence, for simplicity, residual space is not shown in most figures, but this should not be interpreted to mean that residual space is excluded from this invention.

Notes:
1. In all figures the direction of increasing memory addresses is up. Hence terms such as "above" and "below" mean higher memory and lower memory, respectively.
2. "prechunk" means the chunk before (i.e. below) and "postchunk" means the chunk after (i.e. above).
3. For clarity, the figures identify data blocks and CCBs rather than chunks. A CCB and the data block above it constitute a chunk. Each CCB is dark shaded, each inuse data block is light shaded, and each free block is unshaded for clarity.
4. To reduce verboseness, chunks may be identified as in the following example: "inuse chunk 609+610" means the same as "inuse chunk consisting of CCB 609 and inuse/free block 610."

Heap Structure

Figure 1:
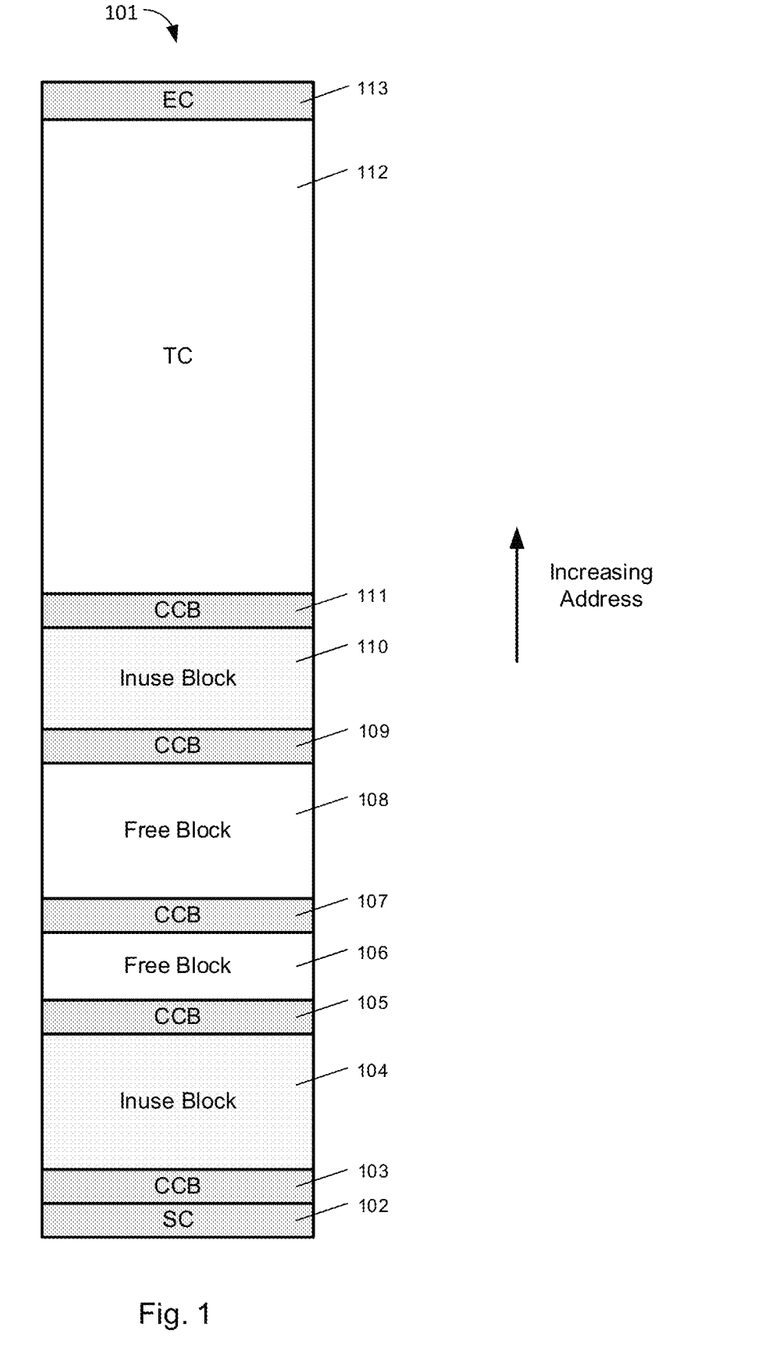
FIG. 1 shows the heap memory after a few allocations and frees.

FIG. 1 shows a heap memory 101 after a few allocation and free operations. Chunk 102 is the Start Chunk (SC), which marks the start of the heap; it is an inuse chunk, consisting only of a CCB, with no data block. 103, 105, 107, 109, and 111 are CCBs. 104 and 110 are inuse data blocks. 106 and 108 are free data blocks. Chunk 112 is the Top Chunk (TC); contains unused heap memory. TC 112 initially contains all heap memory available for allocation. Data blocks 106 and 108 were allocated from TC, then freed and can now be used for new allocations. Chunk 113 is the End Chunk (EC), which marks the end of the heap; it is an inuse chunk, consisting only of a CCB, with no data block.

Aligned Allocations

Figure 2A:
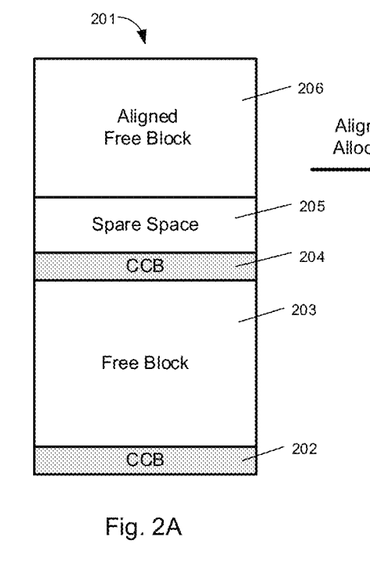
FIG. 2A shows an aligned data block and spare space in a free chunk above a free chunk.

FIG. 2A shows a heap section 201 that contains a lower free data block 203 and an upper aligned free data block 206. Data block 206 is such that its lower boundary address is a multiple of 2^an, where an is the requested alignment number, it is of the requested size, and it fits within the chunk comprised of 204, 205, and itself 206. For example, if an=5, then pointer 209 is 32-byte aligned. Spare space 205 exists between the aligned data block 203 and CCB 204.

Figure 2B:
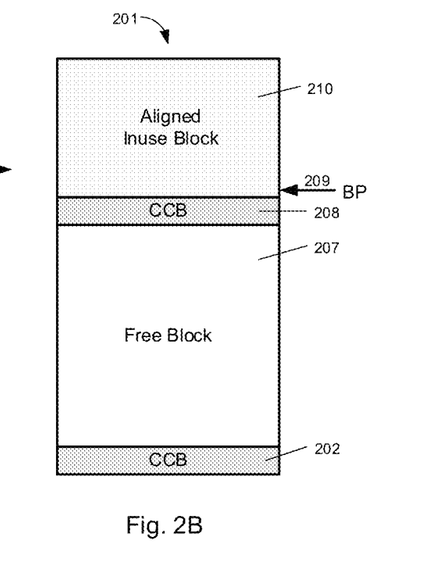
FIG. 2B shows the same heap area after CCB has been moved under the aligned data block to create an inuse chunk and spare space has been merged with free chunk below.

FIG. 2B shows the final result of the aligned allocation for the same heap section 201. A new inuse chunk consisting of CCB 208 and aligned inuse data block 210 has been formed. A block pointer 209 to the aligned data block 210 is returned to the requestor. Spare space 205 has been merged with free data block 203 to form a larger free data block 207.

Figure 3A:
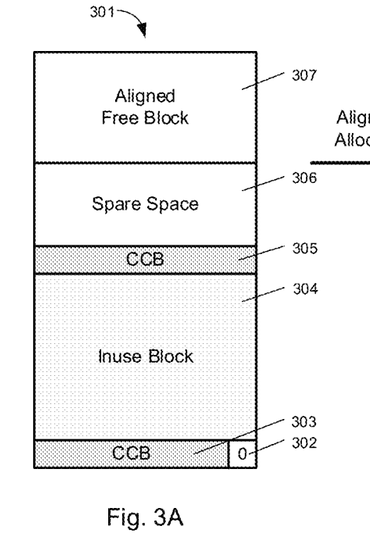
FIG. 3A shows an aligned data block and spare space in a free chunk above an inuse chunk that has no spare space.

FIG. 3A shows a heap section 301 that is similar to FIG. 2A, except that lower data block 304 is inuse. The inuse chunk consisting of CCB 303 and data block 304 has no spare space and thus its spare space flag 302 is 0. An aligned free data block 307 has been found such that its lower boundary address is a multiple of 2^an, where an is the requested alignment number, it is of the requested size, and it fits within the chunk consisting of CCB 305, spare space 306, and itself 307. Spare space 306 exists between data block 307 and CCB 305.

Figure 3B:
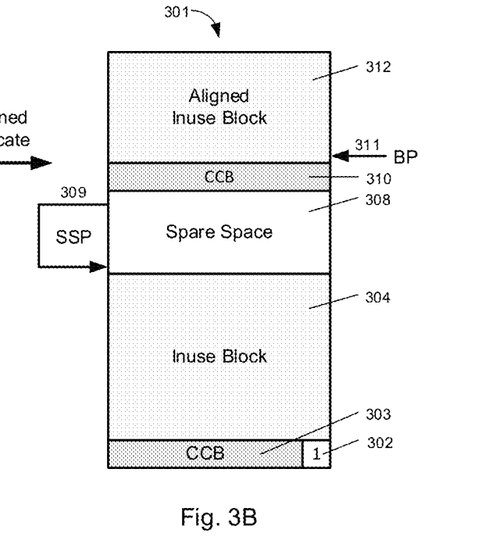
FIG. 3B shows the same heap area after CCB has been moved under the aligned data block to create an inuse chunk and spare space has been added to the inuse chunk below.

FIG. 3B shows the final result of the aligned allocation for the same heap section 301. A new inuse chunk consisting of CCB 310 and aligned inuse data block 312 has been formed. Spare space 306 has been moved above inuse data block 304, thus forming a new inuse chunk consisting of CCB 303, inuse data block 304, and spare space 308. The last word of spare space 308 is pointer 309 to the start of spare space 308. Spare space flag 302 is now 1.

Figure 4A:
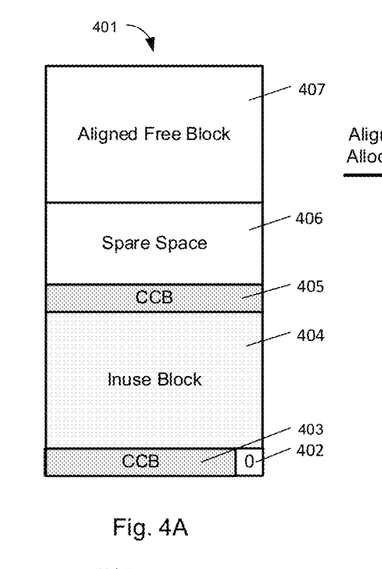
FIG. 4A shows an aligned data block and spare space in a free chunk above an inuse chunk that has no spare space.

FIG. 4A shows a heap section 401 that is identical to FIG. 3A, except that spare space 406 is large enough to become a new free chunk. The criterion for determining this depends upon the heap and is not part of this invention.

Figure 4B:
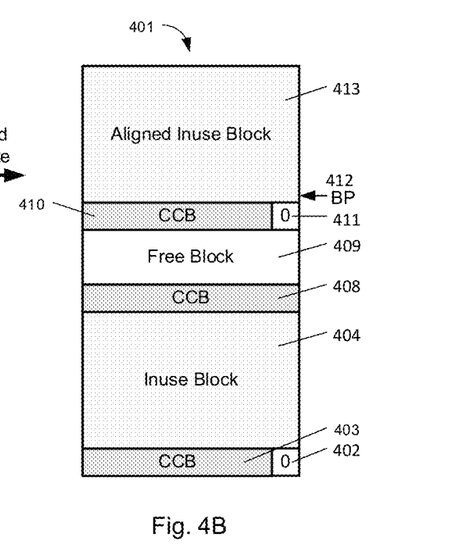
FIG. 4B shows the same heap area after CCB has been moved up under the aligned data block to create an inuse chunk and the spare space has become a new free chunk.

FIG. 4B shows the final result of the aligned allocation for the same heap section 401. A new inuse chunk consisting of CCB 410 and aligned inuse data block 413 has been formed. There is no spare space in this chunk, hence spare space flag 411 is 0. A pointer 412 to data block 413 is returned to the requestor; it is aligned on a 2^an boundary. Spare space 406 has become a new free chunk consisting of CCB 408 and free data block 409.

The lower chunk consisting of CCB 403 and inuse data block 404 is unchanged and its spare space flag 402 remains 0.

Figure 5A:
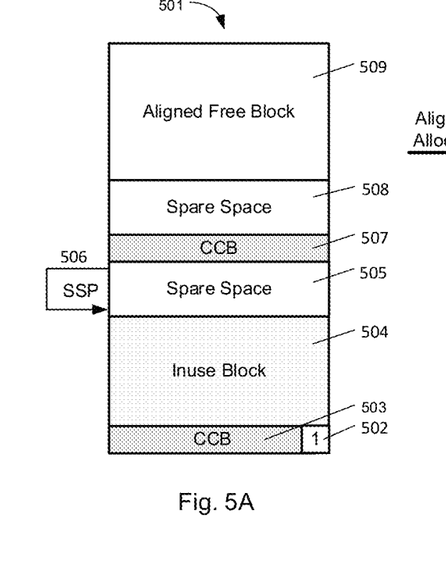
FIG. 5A shows an aligned data block and spare space in a free chunk above an inuse chunk that also has spare space.

FIG. 5A shows heap section 501 that is similar to FIG. 3A, except that inuse chunk 504 has spare space 505 and its spare space flag 502 is 1. Aligned free data block 509, spare space 508, and CCB 507 are the same as their counterparts in FIG. 3A.

Figure 5B:
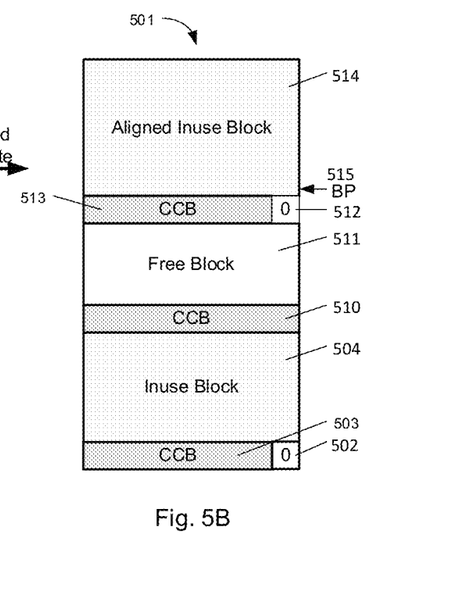
FIG. 5B shows the same heap area after CCB has been moved under the aligned data block to create an inuse chunk and the spare spaces have been merged into a new free chunk.

FIG. 5B shows the final result of the aligned allocation for the same heap section 501. A new inuse chunk consisting of CCB 513 and aligned inuse data block 514 has been formed. There is no spare space in this chunk, so spare space flag 512 is 0. A pointer 515 to data block 514 is returned to the requestor; it is aligned on a 2^an boundary. Spare spaces 508 and 505 have been merged and the merged space is large enough to be converted into a new free chunk consisting of CCB 510 and free data block 511. Muse data block 504 and CCB 503 comprise a new exact-size chunk with spare space flag 502 now 0.

Figure 5C:
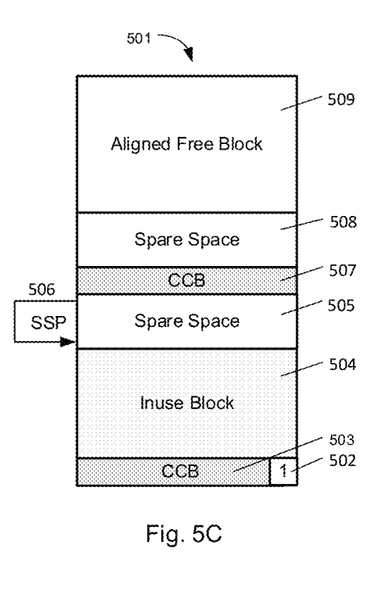
FIG. 5C shows an aligned data block and spare space in a free chunk above an inuse chunk that also has spare space.
Figure 5D:
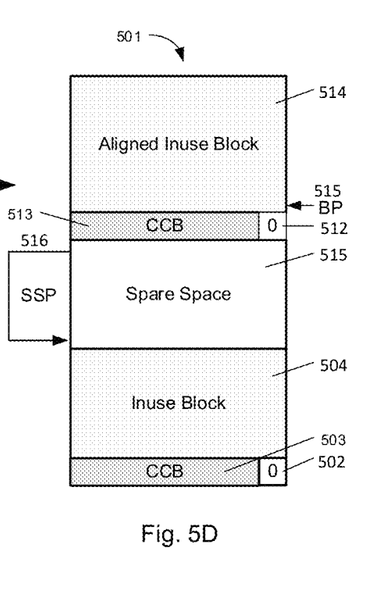
FIG. 5D shows the same heap area after CCB has been moved under the aligned data block to create an inuse chunk and the spare spaces have not been merged into a new free chunk.

FIG. 5C is identical to FIG. 5A and is repeated for convenience to compare to FIG. 5D. FIG. 5D is identical to FIG. 5B, except that in this case, the merged spare space is not large enough to be converted into a new free chunk 511. Instead, it remains as free space 515 above inuse block 504 and SSP 516 is located at the top of spare space 515, yet points to the same start of spare space as SSP 506.

MPU Region Allocations

A region search starts with a requested size, s. The region size, 2^r, is determined such that 2^(r-1) is less than s and s is less than or equal to 2^r. Then the subregion size is 2^(r-n), assuming n subregions per region. For simplicity, we assume 8 subregions per region so that n=3. Some MPUs have more or less subregions. This invention works for any number of subregions.

Then the search size, ss, is determined such that for N=a positive integer, if s is greater than (N-1)*2^(r-3) and s is less than or equal to N*2^(r-3), then ss=N*2^(r-3). For example, if s=600 bytes, then 2^r=1024 bytes, a subregion=128 bytes, and ss=5*128=640 bytes. Then an aligned search is made using ss for the size and an=7 for the alignment number. When such a chunk is found the final requirement is that all subregions of the data block must be in the same region.

FIG. 6 shows a method for allocating MPU regions from a heap. Shown in FIG. 6A, a heap section 601 has been found containing a free chunk consisting of CCB 605, spare space 606, region free data block 607, and residual free space 608, which can be of any size, depending upon the free chunk size. Above this is inuse chunk 609+610 and below it is inuse chunk 603+604 with spare space flag 602 set to 0 since the chunk has no spare space.

Figure 6A:
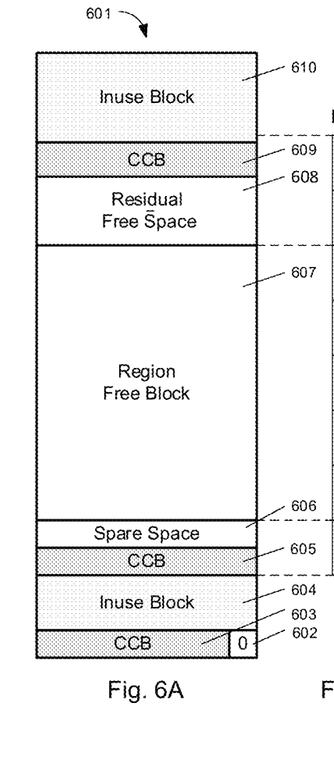
FIG. 6A shows a free data block consisting of residual free space, a region free data block, and spare space; above and below are inuse chunks with no spare space.
Figure 6B:
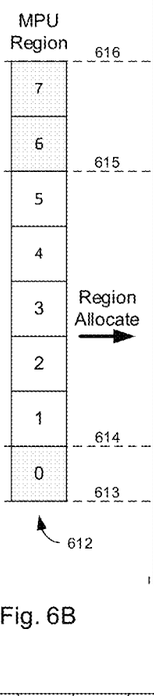
FIG. 6B shows a region diagram with its subregions 1 through 5 lining up with the region free data block.

FIG. 6B shows how MPU region 612 aligns with region free data block 607. Region 612 has 8 subregions numbered 0 to 7. Region 612 begins on boundary 613, which is a multiple of 2^r, where r is the region alignment number. For example, if r=10, then boundary 613 is on a multiple of 2^10=1024 bytes, and each subregion is on a boundary of 2^(10−3)=128 bytes. Region 612 ends one byte below the region boundary 616 for the next region above it.

Region free data block 607 is aligned on subregion 1 boundary 614 and ends one byte below subregion 6 boundary 615. It contains 5 subregions 1 through 5. It should be appreciated that this is just an example. A region free data block must be an integral number of subregions large enough to hold the requested block size. In this case the requested size, s, is greater than 4 subregions and less than 5 subregions in size, so it has been rounded up to 5 subregions. In actual use, the final block size may be anything from 5 to 8 subregions and the data block can be aligned on any subregion boundary as long as the whole region free data block 607 fits within the same region. For example, instead of being aligned on subregion 1, data block 607 could be aligned on subregion 3. However, it could not be aligned on subregion 4, because the last subregion would be outside of region 612.

Figure 6C:
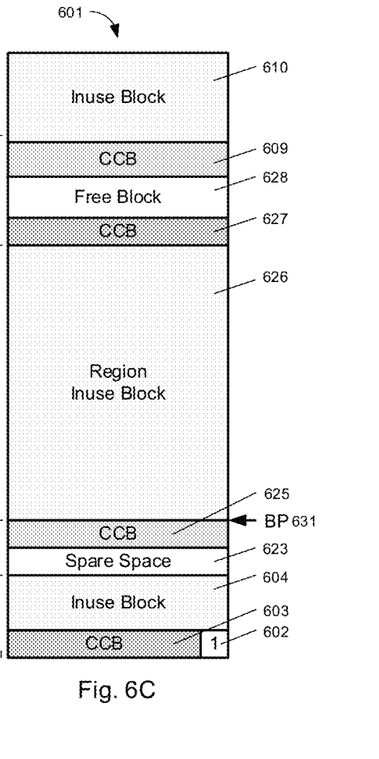
FIG. 6C shows the same heap after CCB has been moved under the region data block to create an inuse region chunk, the residual space has become a new free chunk, and the spare space has been added to the inuse chunk below.

A unique aspect of this invention is that the region data block 607 need not be aligned on a region boundary, but rather can be aligned on a much smaller subregion boundary such as 614. This reduces the time to find a suitable free chunk and may reduce wasted space. FIG. 6C shows the final region allocation for the same heap section 601. The region free data block 607 becomes region inuse chunk 625+626. Block pointer 631, aligned on subregion boundary 614, is returned to the requestor. Spare space 606 has been moved to become spare space 623 in chunk 603+604. Muse data block 604 and CCB 603 do not change. Spare space flag 602 has become 1, due to spare space 623. Residual free space 608 has been split off of chunk 625+626 to become a new free chunk 627+628. This occurs if residual free space 608 is at least as large as the minimum chunk size permitted by the heap. Otherwise, it would become spare space at the top of chunk 625+626. Muse chunk 609+610 is unchanged.

Figure 6D:
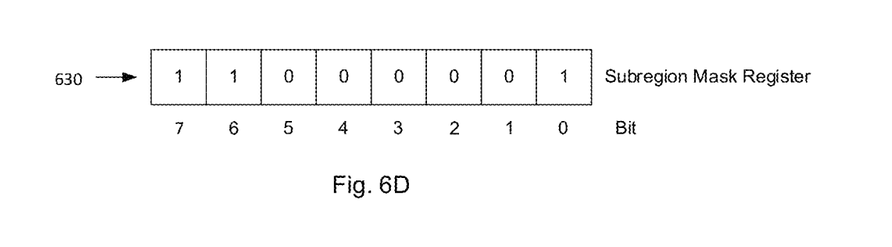
FIG. 6D shows the corresponding subregion mask register that will be loaded into the MPU slot for this region.

FIG. 6D shows a subregion mask register 630 for the MPU. It should be appreciated that the exact operation of an MPU and its subregions is not part of this invention and is shown here only for completeness. In this case, subregion mask 630 is loaded into the MPU slot for MPU region 612. It has a bit for each subregion. Bit 0 corresponds to subregion 0, etc. Note that bits 0, 6 and 7 are 1's meaning that access to these subregions is not permitted, whereas bits 1 through 5 are 0's meaning that access to these subregions is permitted. Hence, access to data block 626 is permitted, but attempted access to CCB 627 or above is not permitted; similarly, access to CCB 625 or below is not permitted. In both cases a Memory Manage Fault (MMF) will occur, which immediately switches control to the MMF handler. This handler takes appropriate action to prevent damage to heap section 601, such as changing CCB 627, and thus the heap is safe from tampering.

The main differences between aligned allocations and MPU region allocations are as follows:
 1. Alignment is on a subregion boundary.
 2. The requested size is rounded up to the least number of subregion sizes that contain it.
 3. All of these subregions must fit within the same region.

So, the MPU region chunk search is similar to an aligned search, except that the data block found must be entirely with an MPU region.

Integrated Block Pools

Figure 7:
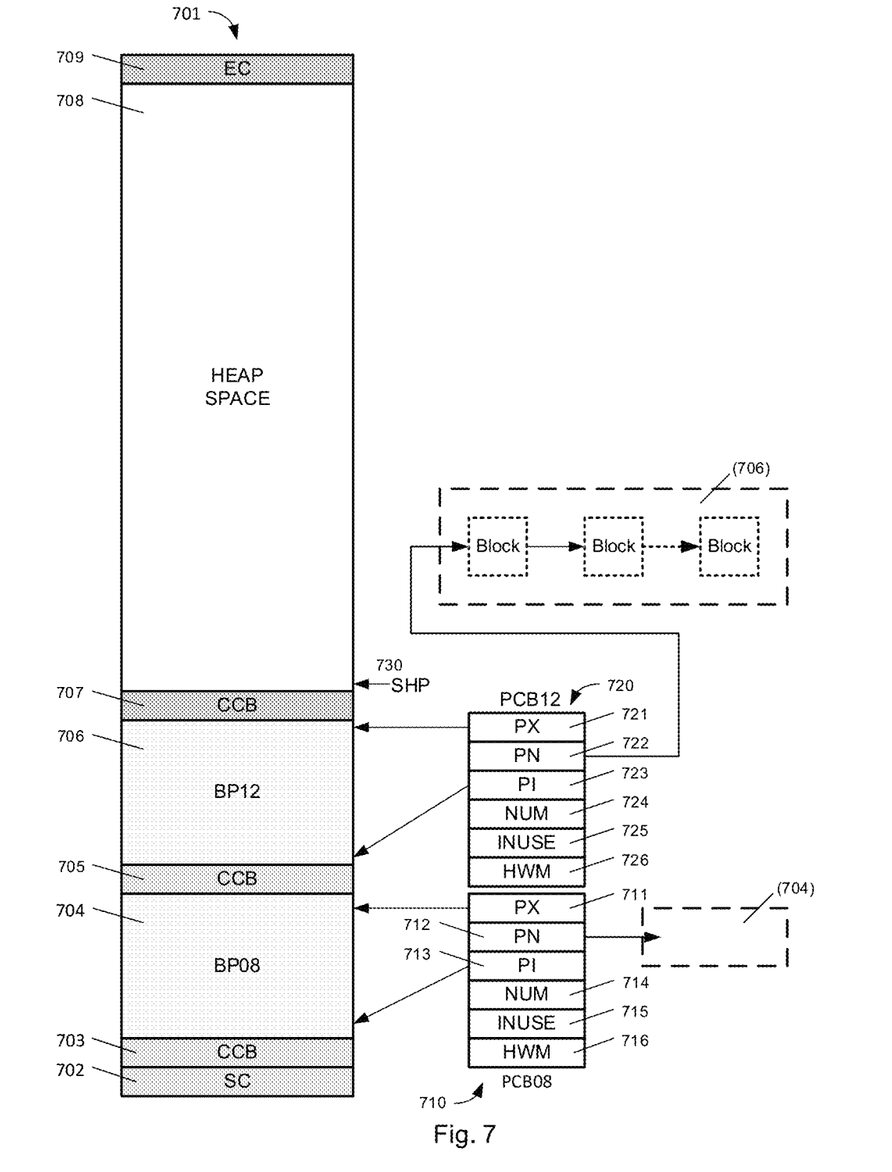
FIG. 7 shows 8-byte and 12-byte block pools allocated from the bottom of the heap and the pool control blocks that control them.

FIG. 7 shows the initial structure of heap 701 with 8-byte and 12-byte block pools for a simple example. In actual use, the smallest pool could have 4-byte blocks and any number of block pools could be present. Block pools must be separated in size by 4 bytes, but separations can be any multiple of 4 bytes. The number of pools, the block size of each pool, and the number of blocks in each pool are determined by the programmer to optimize performance for his application. Two pools are sufficient to explain this method and thus are shown here for simplicity FIG. 7 shows the start chunk (SC) 702 followed by an 8-byte block pool (BP08) 704, a 12-byte block pool (BP12) 706, heap space 708, and the end chunk (EC) 709. Heap space 708 may consist of any mixture of inuse and free chunks plus a Top Chunk, as shown in FIG. 1. An external Pool Control Block (PCB08) 710 controls access to pool 704. It contains the last block pointer (PX) 711, the next block pointer (PN) 712, the first block pointer (PI) 713, the number of blocks in the pool (NUM) 714, the number of blocks in use (INUSE) 715, the high-water mark for inuse blocks (HWM) 716, and may have other useful fields.

An external Pool Control Block (PCB12) 720 controls access to pool 706. It contains a last block pointer (PX) 721, a next block pointer (PN) 723, a first block pointer (PI) 722, the number of blocks in the pool (NUM) 724, the number of blocks inuse (INUSE) 725, the high-water mark (HWM) 726, and other useful fields.

An external start of heap pointer (SHP) 730, points to the first chunk of the heap.

Initially, PN field 722 of PCB12 720 points to the first block in pool 706; the first word of this block points to the next block, etc., until all blocks in pool 706 are linked together into a singly-linked free list, as shown in the dashed pool 706. The last block containing 0 in its first word. This is the common way that block pool free lists are structured. It is not part of this invention and shown only for completeness in FIG. 7 using dashed and dotted lines. Block pool BP08 704 has a similar singly-linked free block list, which is shown only in outline in FIG. 7 due to lack of space.

A data block may be allocated from block pool 704 if the requested size is 8 bytes or less. If the alignment number, an, is 3 or less, the block pointed to by PN 712 is taken and its first word is loaded into PN 712. PN 712 will be 0 if the pool free list is now empty. If an is greater than 3, the free list pointed to by PN 712 is searched for up to N blocks to find a block with alignment 2^an, where N is a compile-time configuration constant chosen by the programmer. If an aligned block is not found or if block pool 704 is empty, the data block is taken from heap space 708.

A data block may be allocated from block pool 706 if the requested size is 12 bytes or less and greater than 8 bytes. If the alignment number, an, is 2 or less, the block pointed to by PN 722 is taken its first word is loaded into PN 722. PN 722 will be 0 if the pool free list is now empty. If an is greater than 2, the free list pointed to by PN 722 is searched for up to N blocks to find a block with alignment 2^an, where N is a compile-time configuration constant chosen by the programmer. If not found or if block pool 706 is empty, the data block is taken from heap space 708.

In PCB08 710, NUM field 714 is set to the number of blocks in pool 704, INUSE field 715 keeps track of how many blocks are currently in use, and HWM field 716 records the largest value of INUSE 715 since operation began. If, after a long run, HWM field 716 equals NUM field 714 then block pool 704 has been exhausted and additional blocks have been allocated from heap space 708. The programmer can increase the size of block pool 704 until this no longer happens. Then he has a good idea of peak demand for blocks from block pool 704 and he can set block pool 704 size smaller to achieve a good balance between performance and memory usage. The same applies to block pool 706.

When a data block is freed, its block pointer, bp, is tested. If bp is greater than SHP 730, the data block is freed to heap space 708. Otherwise, if bp is greater than or equal to PI 723 it is freed to block pool BP12 706 by adding it to the free block list pointed to by PN 722. Otherwise, it is freed to block pool BP08 704 by adding it to the free block list pointed to by PN 712. This method is fast enough for a few block pools. If there are more block pools another method, such as binary search, can be employed to find the correct pool.

Free Operation with Spare Space

Figure 8A:
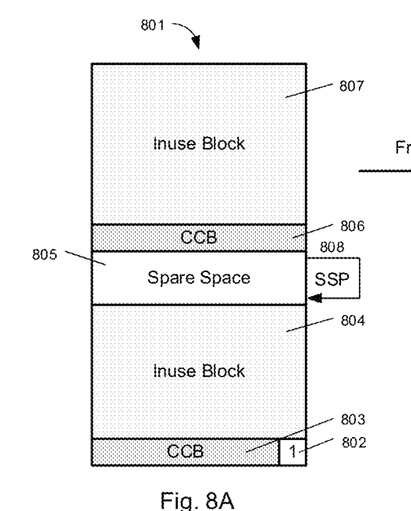
FIG. 8A shows two inuse chunks of which the lower has spare space.

FIG. 8A shows heap section 801 with inuse chunk comprised of CCB 803, inuse data block 804 and spare space 805. Spare space pointer 808 in the last word of spare space 805 point to the beginning of spare space 805. Spare space flag 802 is set to 1. Above this is inuse chunk 806+807.

Figure 8B:
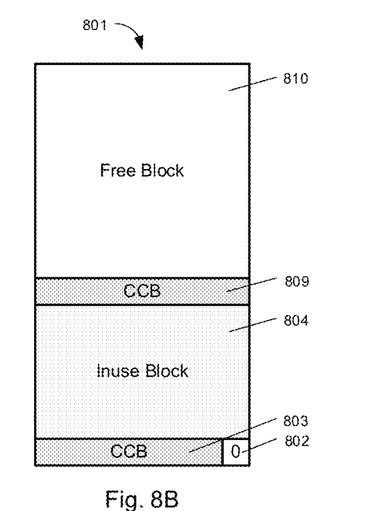
FIG. 8B shows the same heap area after the upper chunk is freed with spare space merge enabled.

FIG. 8B shows the final result of a free operation if spare space merge on free is allowed. In this case spare space 805 in the lower chunk has been merged with the space freed from inuse data block 807 to create the larger free data block 810 and a new CCB 809. Inuse data block 804 is unchanged. CCB 803 forward link is changed and spare space flag 802 is now 0.

Figure 8C:
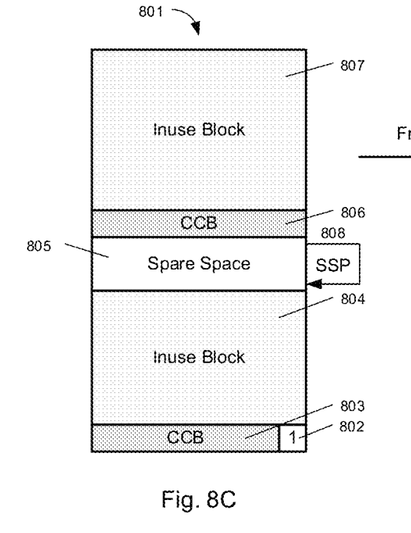
FIG. 8C is identical to FIG. 8A.

FIG. 8C is identical to FIG. 8A.

Figure 8D:
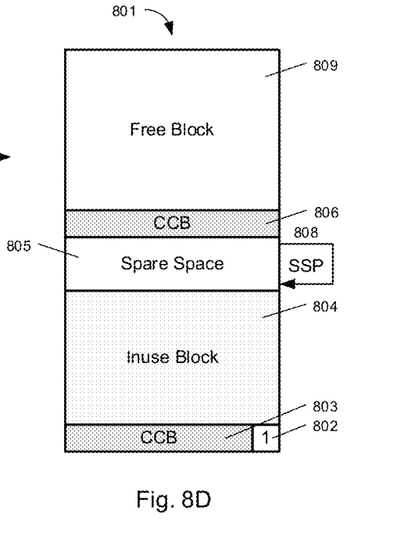
FIG. 8D shows the same heap area after the upper chunk is freed with spare space merge not enabled.

FIG. 8D shows the final result of a free operation if spare space merge on free is not allowed. In this case inuse data block 807 becomes free data block 810 of the same size and CCB 806 stays the same except to indicate a free chunk. The lower inuse chunk 803+804 with spare space 805 stays the same and spare space flag 802 remains 1.

Aligned Search

Figure 9A:
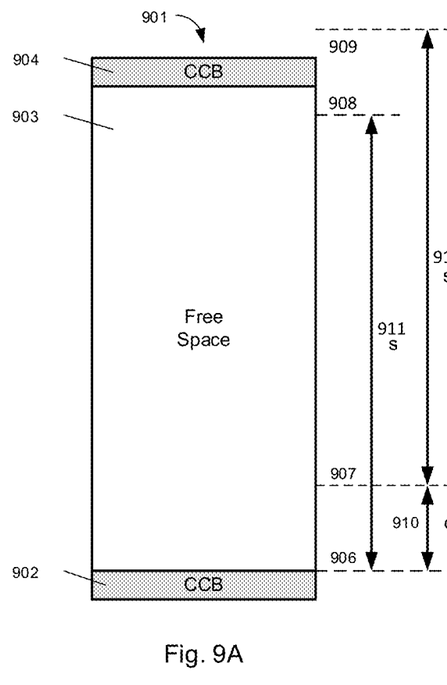
FIG. 9A shows a candidate chunk that fails the aligned search test.

FIG. 9A shows heap section 901 with a candidate free chunk composed of CCB 902 and free space 903. Above this is CCB 904. A candidate free chunk is a chunk with a large enough free space 903 for the requested size s 911. The method for finding this chunk is the same as for any chunk and is dependent upon the heap; it could be sequential, bin, tree, or other search method. This invention works with any candidate search method.

When a candidate chunk 902+903 has been found, the next step is to find the first $2^{an}$ boundary 907 above the start of free space 906, where an is the requested alignment number. The distance between the start of free space 906 and boundary 907 is d 910. d is in the range of 0 to $2^{an}-1$. In this case s+d exceeds free space 903, so chunk 902+903 is rejected and a search is made for another candidate free chunk.

Figure 9B:
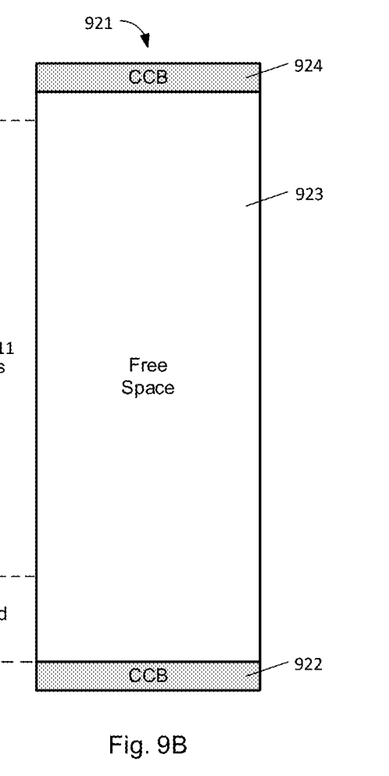
FIG. 9B shows a candidate chunk that passes the aligned search test.

FIG. 9B shows a different heap section 921 with candidate free chunk 922+923. In this case, free space 923 is large enough for d+s, so this chunk becomes the allocated chunk used in previous FIGS. 2 through 5.

Conclusion, Ramifications, and Scope

It should be appreciated that the foregoing is but one embodiment of this invention, which has been chosen here to present a clear description of all of the features of the invention. It should be recognized by one skilled in the art that the introduction of spare space has the following advantages and ramifications:

1. The found chunk holding an aligned data block can be smaller because it is not necessary that the spare space between the CCB and the aligned data block be at least as large as the required minimum chunk size, unless it is 0.
2. Merging spare space into a free prechunk reduces heap fragmentation versus creating a new free chunk.
3. Moving spare space into an inuse prechunk allows spare space not large enough to form a free chunk to be accessible to future merging.
4. Moving spare space into an inuse prechunk and merging with existing spare space in the inuse prechunk, then freeing the combined spare space, if large enough, results in a larger free chunk versus freeing only the spare space from the found chunk. This reduces heap fragmentation.
5. When a data block is allocated, converting residual space not large enough to be split into a new free chunk into spare space allows the space to be reclaimed in the future by an aligned allocation or a free, thus reducing internal heap fragmentation.
6. Offering a compile-time option to not reclaim inuse prechunk spare space during a free operation, allows growing the population of pre-aligned data blocks, thus making future aligned allocations faster.

The foregoing advantages make aligned allocations more practical in embedded systems with limited memory. Embedded systems frequently have heavy I/O loads and I/O controllers often require aligned buffers, packets, arrays, and structures. Being able to allocate these from a heap simplifies programming and increases software flexibility. In addition, doing cache-line aligned allocations from a heap in DRAM can result in significantly improved performance. Finally, aligned allocations are necessary to create dynamic regions for the Cortex v8M MPU.

It should be recognized by one skilled in the art that the introduction of MPU region allocations allows dynamic Cortex v7M MPU region creation, which is useful for:

1. Task stacks allocated when tasks are created and freed when tasks are deleted. Such task stacks have the advantage that stack overflows or attempts to execute from them immediately cause MMFs, thus defeating two primary hacking techniques.
2. A protected message can be dynamically created, loaded with data, sent to another task, and dynamically freed by that task when no longer needed. This capability is helpful to create isolated code partitions. Protected messages are accessible to only one partition at a time. Thus, a hacker cannot change a message being processed by another partition in order to damage that partition. Nor can a hacker overflow a message, execute from a message, nor modify a read-only message. These features prevent hacker attempts to use messages to breach other partitions from an already breached partition.
3. Protected buffers can be dynamically created and used by tasks. Buffer overflows cause immediate MMFs. Attempts to execute from buffers also cause immediate MMFs, defeating two more hacking techniques.

Thus, the ramifications of this unique heap service are to improve the security of embedded and similar systems.

It should be recognized by one skilled in the art that the introduction of integrated block pools combines the fast access and low overhead of block pools for very small blocks with the flexibility of heaps for larger blocks. The advantages of this method are:

1. Block pools have zero overhead on pool-size blocks.
2. Block pool allocations and frees are much faster than corresponding heap operations.
3. Data blocks are transparently allocated from the heap if a size or alignment requirement cannot be met from the selected pool.

4. This method allows any mixture of pool data blocks and heap data blocks to be in use at any time and when freed, these data blocks automatically go back to their sources.
5. Pool allocations are fully integrated with standard malloc( ), calloc( ), and realloc( ) heap operations and with data block alignment requirements.
6. Keeping track of high-watermark usage vs. pool size allows a programmer to size his pools for normal usage and rely upon the heap for peak usage.

As a consequence, block pools need not be sized for peak demand, which is met by heap backup when pools become empty or cannot satisfy alignment requirements. Thus, a tradeoff can be made between the size of each pool and overall system performance. In essence, block pools have been made to look like part of the heap to application programmers. This simplifies their job and reduces programming errors, while achieving excellent performance and memory efficiency for the small data block allocations typical of object-oriented languages.

The invention claimed is:

1. A method for allocating aligned, Memory Protection Unit (MPU) region, and very small data blocks from a heap and freeing said blocks back to said heap, comprising:
   initializing said heap to have start and end chunks to mark the boundaries of said heap and a chunk called the "top chunk" which initially has all available space to allocate from said heap;
   structuring said heap to consist of chunks each with a chunk control block (CCB) and further with either an inuse data block or a free data block, and said CCB is used to doubly-link chunks together and to provide control information for each chunk;
   accepting allocation commands, including reallocation commands, from other software to obtain chunks, each said chunk starting with said CCB followed by a data block of a requested size from said top chunk or from a large-enough free chunk after some inuse chunks have been freed back to said heap, and returning pointers to said data blocks within said obtained chunks;
   accepting allocation commands from said other software to obtain chunks containing said CCBs and MPU region data blocks, wherein an MPU region is aligned on a power of two size and said MPU region data block consists of equal-size contiguous subregions within said MPU region, and returning pointers to said MPU region data blocks;
   accepting allocation commands from said other software to obtain small data blocks and supplying said small data blocks from integrated block pools instead of from said heap, or automatically from said heap when said small data blocks cannot be allocated from said integrated block pools due to required block sizes or alignments being not available, and returning pointers to said small data blocks;
accepting free commands from said other software using pointers to said aligned data blocks or to said MPU region data blocks to free said heap chunks containing said aligned data blocks or said MPU region data blocks back to said heap; and
   accepting free commands from said other software using pointers to said small data blocks to free said small data blocks back to said integrated block pools or to free said heap chunks containing said small data blocks back to said heap;
   wherein using a search method of said heap, a chunk is found containing a data block of the size and alignment required by an allocation command, wherein said found chunk has spare space between the CCB and the data block, in which case the CCB in said found chunk is moved before the data block in said found chunk and said spare space is now before the CCB.

2. The method of claim 1 wherein a preceding chunk (prechunk) is free, in which case said spare space is merged into said free prechunk.

3. The method of claim 1 wherein a preceding chunk (prechunk) is inuse and said prechunk has no spare space after its data block, in which case said spare space becomes part of said prechunk following its data block, the last word of said spare space is set to point to the start of said spare space, and a spare space flag (SSP flag) is set in the CCB of said found chunk.

4. The method of claim 1 wherein a preceding chunk (prechunk) is inuse and said prechunk has spare space after its data block, in which case said spare spaces are combined and an initial spare space pointer is moved to the last word of the combined spare space.

5. The method of claim 4 wherein if said combined spare space is now greater than or equal to a minimum chunk size permitted by said heap, the combined spare space may be split from the prechunk into a new free chunk.

6. The method of claim 1 wherein an MPU region allocation is performed by finding the smallest region size R that is a power of two equal to or larger than the size S, required by the MPU region allocation command, finding the subregion size SS=R/N where N is the number of subregions per region for said MPU, finding M where M is a positive integer such that M*SS>=S and S>(M−1)*SS, doing an aligned allocation for size=M*SS and alignment=SS, and additionally requiring that an entire found data block, consisting of said M subregions, is entirely within said size R region.

7. The method of claim 1, wherein each said data block pool consists of free blocks of equal size linked together into free block lists, said pools are allocated from said heap, during initialization, and beginning and ending pointers to said pools, pointers to said free block lists in said pools, and other information are maintained in heap control memory.

8. The method of claim 7, wherein a smallest block pool block size must be at least 4 bytes, pool block sizes are separated by at least 4 bytes, and at least one block pool in the range from 4 bytes to a largest pool block size is present.

9. The method of claim 8, wherein an allocation is first made from a pool of the required block size if said pool exists, its free block list is not empty, and one of a programmer-specified number of first blocks in said free block list meets the alignment required by the allocation command, else said allocation is made from said heap.

10. The method of claim 8, wherein a data block is freed to a block pool for which its block pointer is in the range of said beginning and ending block pool pointers, otherwise said data block is freed to said heap.

11. The method of claim 1 wherein, during a non-aligned allocation, space in a found chunk following its data block that is too small to split into a residue chunk becomes spare space of said found chunk, the last word of said spare space is set to point to the start of said spare space, and an SSP flag is set in said the CCB of said found chunk.

12. The method of claim 1 wherein, while freeing a chunk for a free command operation, spare space in an inuse prechunk may be combined with said chunk being freed, and said prechunk has an SSP flag, which is cleared.

13. The method of claim 12 wherein a compile-time configuration constant exists to disable combining of prechunk spare space with free chunks.

* * * * *